June 4, 1929.  E. A. LUNDGREN  1,715,935
STORAGE BATTERY
Filed Oct. 15, 1927
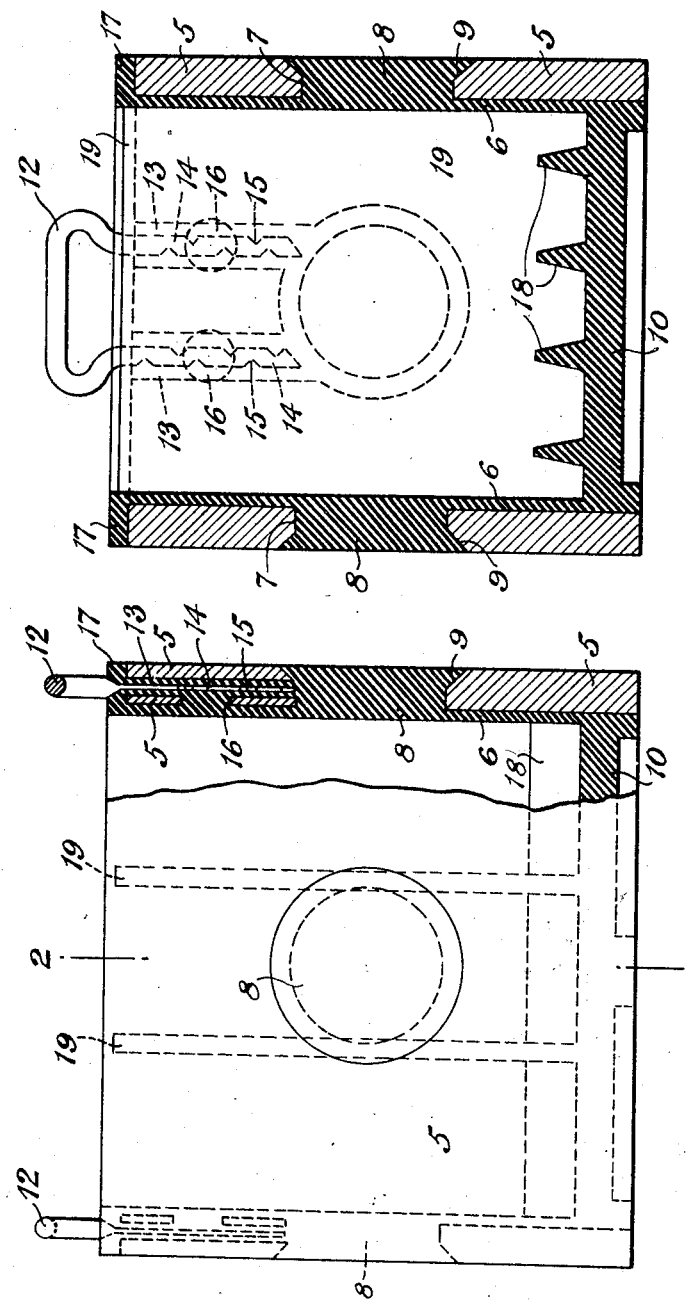
INVENTOR
Edward A. Lundgren
BY
Ernest Hopkinson
ATTORNEY Patented June 4, 1929.

1,715,935

UNITED STATES PATENT OFFICE.

EDWARD A. LUNDGREN, OF PROVIDENCE, RHODE ISLAND, ASSIGNOR TO REVERE RUBBER COMPANY, OF CHELSEA, MASSACHUSETTS, A CORPORATION OF RHODE ISLAND.

STORAGE BATTERY.

Application filed October 15, 1927. Serial No. 226,279.

This invention relates to improvements in containers, more particularly storage batteries and has for its primary object to provide a construction which is strong, durable and inexpensive. Further objects of the invention are to provide a permanent bond between a composition lining and a protective casing and to provide an improved method of attaching handles to the container.

Other objects and advantages of the invention will be better understood by reference to the following specification when considered in connection with the accompanying drawing, in which:

Fig. 1 is a side elevation partially in section of one embodiment of the invention.

Fig. 2 is a vertical section on the line 2—2 of Fig. 1.

In the embodiment of the invention, as shown in the drawing, the container is a three-cell type consisting primarily of an outer shell or protective casing 5 preferably of wood or other suitable cellulosic material and an inner lining 6 of suitable acid resisting composition such as an asphalt, rubber, or the like. In the present embodiment the casing or frame extends only about the sides and ends of the inner shell or lining and is open at the top and bottom. The walls of the casing are preferably provided with one or more perforations 7 (only one being shown) and the materials of the lining projects into the same as at 8 to form a permanent connection or bond between the casing and the lining. This bond may be strengthened by enlarging or countersinking the perforations as at 9 so that the plastic lining material filling the same forms interlocking shoulders which rivet the casing fast, if desired permanently therewith.

Suitable handles as 12 may be provided at opposite ends of the container. Socket openings 13 are provided internally of the casing into which the material of the lining flows during manufacturing. The downwardly projecting flat or blade portions 14 of the handles are embedded in the material of the lining within these grooves. Notches 15 provided in the handles interlock with the plastic composition lining and prevent the handles from being withdrawn. Perforations 16 in the walls of the casing preferably communicate with the socket openings 13 so that flow of the asphalt rubber or other composition in the socket openings 13 is insured and a further interlocking or riveting of the casing to the composition is afforded. The lining preferably extends over the upper edge of the casing as at 17 and this not only performs the usual function of protecting the casing from the chemicals used in the jar but provides supplemental connection between the lining (composition) and the casing.

In the preferred embodiment of the invention the lining material forms the bottom wall 10 of the container, but may be reinforced with the same material as the side walls if desired. The usual ribs 18 and partitions 19 are provided and formed integral with the lining.

The container may be manufactured in any suitable and convenient manner but an advantageous method is to place the protective casing in a suitable mold and introduce the proper quantity of plastic lining composition preferably in suitable condition for pressing to shape. A plunger of proper design is then forced into the mass of plastic to mold the composition lining to the required form. The lining composition is forced into the perforations 7 and 16 and the socket openings 13. Prior to the molding of the lining, the handles 12 are properly positioned in the socket opening 13 and then held during the molding operation so that they become embedded firmly in the lining composition.

The four walls of the casing 5 may be joined at the corners by nailing, stapling, mitering, dovetailing if of wood as is preferred or by making integral if of other material permitting such manufacture, but such corner-joining may be dispensed with in some instances. Inasmuch as the walls of the reinforcing casing preferably extend to the bottom of the container the casing carries the weight of the container and also reinforces against wear on the composition bottom of containers to a substantial extent since the bottom corners are subjected to abrasion most severely.

The providing of the interlocking or riveted connections between the lining and the casing not only prevents separation or relative movement of these parts but permits the use of low cost materials or small quantities of better grade insulating plastics such as rubber composition. The embedding of the handles in the lining forms a secure anchorage for permanent handles, when desired, and also eliminates any possibility of these being affected by the acids or other chemicals used in the container. The combination of a four-wall casing without any bottom and the plastic lining and bottom provides desired strength, rigidity and insulating qualities in practically all climates.

Having thus described my invention, what I claim and desire to protect by Letters Patent is:

1. A battery jar comprising a wood casing open at its top and bottom and provided with apertures in its side walls, a lining of acid resistant composition covering the inner face of the casing and extending over the top edge thereof, said lining having projections integral therewith which interengage with the apertures in said side walls and having a bottom integral therewith, the wood side walls having slots therein, handles having projections extending within said slots, said handles being united to the casing by the composition within the slots.

2. A battery jar having a wood casing open at its top and bottom and having chamfered apertures in its sides, a lining of acid resistant material molded to the inner surface of the jar with projections integral therewith molded into the apertures in the side walls, the casing having slots, handles projecting into said slots, and molded composition uniting the handles with the casing.

Signed at Providence, county of Providence, State of Rhode Island, this 7th day of October, 1927.

EDWARD A. LUNDGREN.